United States Patent
Amemiya

(10) Patent No.: US 9,469,345 B2
(45) Date of Patent: Oct. 18, 2016

(54) SUSPENSION TOWER AND VEHICLE FRONT PORTION STRUCTURE

(71) Applicant: TOYOTA JIDOSHA KABUSHIKI KAISHA, Toyota-shi, Aichi-ken (JP)

(72) Inventor: Koji Amemiya, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 8 days.

(21) Appl. No.: 14/740,754

(22) Filed: Jun. 16, 2015

(65) Prior Publication Data

US 2015/0367888 A1    Dec. 24, 2015

(30) Foreign Application Priority Data

Jun. 20, 2014    (JP) .................................. 2014-127407

(51) Int. Cl.
| | |
|---|---|
| *B60N 99/00* | (2006.01) |
| *B62D 21/11* | (2006.01) |
| *B62D 25/08* | (2006.01) |
| *B62D 21/15* | (2006.01) |

(52) U.S. Cl.
CPC ............... *B62D 21/11* (2013.01); *B62D 21/15* (2013.01); *B62D 25/088* (2013.01)

(58) Field of Classification Search
CPC ..... B62D 21/11; B62D 21/15; B62D 25/088
See application file for complete search history.

(56) References Cited

U.S. PATENT DOCUMENTS

| | | |
|---|---|---|
| 2013/0134742 A1 | 5/2013 | Mildner et al. |
| 2013/0221708 A1 | 8/2013 | Hanakawa |

FOREIGN PATENT DOCUMENTS

| | | |
|---|---|---|
| DE | 10 2009 040 322 A1 | 3/2011 |
| DE | 10 2011 119561 A1 | 5/2013 |
| JP | 2013-173485 A | 9/2013 |
| WO | 2007/019935 A1 | 2/2007 |
| WO | 2015/036829 A1 | 3/2015 |

*Primary Examiner* — Lori L Lyjak
(74) *Attorney, Agent, or Firm* — Oliff PLC

(57) ABSTRACT

There is provided a suspension tower including: a top wall in which a shaft hole is formed at a region that faces a central portion of an upper end portion of a suspension of a vehicle; a projecting portion that is formed by an edge portion of the shaft hole at the top wall projecting toward a vehicle upper side; plural ribs that extend from an outer periphery of the projecting portion toward an outer peripheral side of the top wall; a suspension mounting portion that is provided at the top wall between a pair of the ribs that are adjacent to one another, and to which the upper end portion of the suspension is mounted; and an overhang portion that juts-out locally from the projecting portion toward the shaft hole side, between the suspension mounting portion and the shaft hole.

6 Claims, 6 Drawing Sheets

SUSPENSION TOWER AND VEHICLE FRONT PORTION STRUCTURE

CROSS-REFERENCE TO RELATED APPLICATION

This application is based on and claims priority under 35 USC 119 from Japanese Patent Application No. 2014-127407 filed on Jun. 20, 2014, the disclosure of which is incorporated by reference herein.

BACKGROUND

1. Technical Field

The present invention relates to a suspension tower of a vehicle, and to a vehicle front portion structure that has the suspension tower.

2. Related Art

In the suspension tower disclosed in International Publication No. WO 2007/019935, a round shaft hole is formed in a region that faces the central portion of the upper end portion of a suspension, and the edge portion of this shaft hole is a projecting portion that projects-out toward the vehicle upper side. At the periphery of this projecting portion, plural suspension mounting portions are provided so as to be lined-up in the peripheral direction of the projecting portion. Suspension mounting holes for mounting the upper end portion of the suspension are formed in these suspension mounting portions. Further, plural ribs extend in a radial form from the outer periphery of the projecting portion, and the suspension mounting portions are disposed respectively between pairs of adjacent ribs. Note that Japanese Patent Application Laid-Open (JP-A) No. 2013-173485 is another prior art document that relates to suspension towers.

In a suspension tower such as described above, the rigidity with respect to input from the suspension can be improved by the plural ribs. However, it is thought that, at the time when input from the suspension is applied to the suspension mounting portions, the suspension mounting portions and the peripheral regions thereof will deform locally. Therefore, there is room for further improvement from the standpoint of improving the rigidity.

SUMMARY

In consideration of the above-described circumstances, an object of the present invention is to provide a suspension tower and a vehicle front portion structure that contribute to improving rigidity with respect to input from a suspension.

A first aspect of the present invention provides a suspension tower including:

a top wall in which a shaft hole is formed at a region that faces a central portion of an upper end portion of a suspension of a vehicle;

a projecting portion that is formed by an edge portion of the shaft hole at the top wall projecting toward a vehicle upper side;

plural ribs that extend from an outer periphery of the projecting portion toward an outer peripheral side of the top wall;

a suspension mounting portion that is provided at the top wall between a pair of the ribs that are adjacent to one another, and to which the upper end portion of the suspension is mounted; and an overhang portion that juts-out locally from the projecting portion toward the shaft hole side, between the suspension mounting portion and the shaft hole.

In the suspension tower of the first aspect of the present invention, when upwardly-directed input from the suspension is applied to the suspension mounting portion, the suspension mounting portion and the region at the periphery thereof deform so as to become convex toward the vehicle upper side. At this time, the pair of ribs that are adjacent to one another with the suspension mounting portion therebetween deform so as to move apart from one another. As a result, the region, between the suspension mounting portion and the shaft hole, at the projecting portion is pulled so as to be stretched in the aforementioned direction of moving apart. However, the present invention has the overhang portion that juts-out from this region toward the shaft hole side. Because deformation of this region can be suppressed by the overhang portion, this contributes to an improvement in rigidity with respect to input from the suspension.

A second aspect of the present invention provides the suspension tower of the first aspect, wherein an end portion, at the shaft hole side, of the overhang portion includes a flat portion that extends in a flat shape in a direction in which the pair of ribs are adjacent to one another.

In the suspension tower of the second aspect of the present invention, the shaft hole side end portion of the overhang portion, that juts-out locally from the projecting portion toward the shaft hole side between the suspension mounting portion and the shaft hole, includes the flat portion. This flat portion extends in a flat shape in the direction in which the pair of ribs, that are adjacent to one another with the suspension mounting portion therebetween, are adjacent to one another, i.e., in the direction in which the region that is between the suspension mounting portion and the shaft hole at the projecting portion is pulled as described above. Due thereto, stress can be dispersed over the entire flat portion, and therefore, this contributes to making it such that a local concentration of stress does not arise.

A third aspect of the present invention provides the suspension tower of the first aspect, wherein the overhang portion includes an extending portion that extends from an upper end of the projecting portion toward the shaft hole side.

In the suspension tower of the third aspect of the present invention, the overhang portion, that juts-out locally from the projecting portion toward the shaft hole side between the suspension mounting portion and the shaft hole, has the extending portion that extends from the upper end of the projecting portion toward the shaft hole side. This region where the extending portion extends is the region that is pulled most strongly at the time when the pair of ribs, that are adjacent to one another with the suspension mounting portion therebetween, deform so as to move apart from one another. Therefore, by providing the extending portion at this region, deformation of this region can be suppressed effectively.

A fourth aspect of the present invention provides the suspension tower of the first aspect, wherein the overhang portion has an increased thickness portion whose thickness is increased at the shaft hole side of the projecting portion.

In the suspension tower of the fourth aspect of the present invention, the overhang portion, that juts-out locally from the projecting portion toward the shaft hole side between the suspension mounting portion and the shaft hole, has the increased thickness portion whose thickness is increased at the shaft hole side of the projecting portion. This increased thickness portion can be formed easily in a case in which, for example, the suspension tower is manufactured by casting.

A fifth aspect of the present invention provides the suspension tower of the first aspect, wherein the overhang portion is provided over an entire region between a pair of virtual lines that respectively are extensions, toward a central side of the shaft hole, of surfaces, that are at sides opposite the suspension mounting portion, of the pair of ribs that are adjacent to one another.

In the suspension tower of the fifth aspect of the present invention, the extending portion, that extends from the upper end of the projecting portion toward the shaft hole side, is provided as described above. Due thereto, at the upper end of the projecting portion, the rigidity of the entire region that is pulled by the pair of ribs as described above can be improved by the extending portion.

A sixth aspect of the present invention provides a vehicle front portion structure including:

a front side member that extends in a vehicle longitudinal direction;

an upper member that extends in the vehicle longitudinal direction, at a vehicle upper side and a vehicle transverse direction outer side of the front side member;

the suspension tower of any one of the first aspect through the fifth aspect that spans between the front side member and the upper member; and a suspension whose upper end portion is fixed to the suspension mounting portion provided at the suspension tower.

In the vehicle front portion structure of the sixth aspect of the present invention, the suspension tower, that spans between the front side member and the upper member, is the suspension tower of any one of the first through fifth aspects. Therefore, this contributes to an improvement in the rigidity of the suspension tower with respect to input from the suspension. Due thereto, for example, the traveling stability of the vehicle can be improved.

As described above, the suspension tower and vehicle front portion structure relating to the present invention contribute to an improvement in rigidity with respect to input from the suspension.

BRIEF DESCRIPTION OF THE DRAWINGS

Exemplary embodiments of the present invention will be described in detail based on the following figures, wherein.

DETAILED DESCRIPTION

A suspension tower 10 and a vehicle front portion structure 12 relating to embodiments of the present invention are described on the basis of FIG. 1 through FIG. 8. Note that arrow FR, arrow UP, and arrow LH that are shown appropriately in the respective drawings indicate the forward direction (advancing) direction, the upward direction, and the leftward direction of the vehicle, respectively. Hereinafter, when description is given by using merely the longitudinal, left-right, and vertical directions, they mean the longitudinal of the vehicle longitudinal direction, the left and right of the vehicle left-right direction (the vehicle transverse direction), and the vertical of the vehicle vertical direction, unless otherwise stated.

(Structure)

Figure 1:
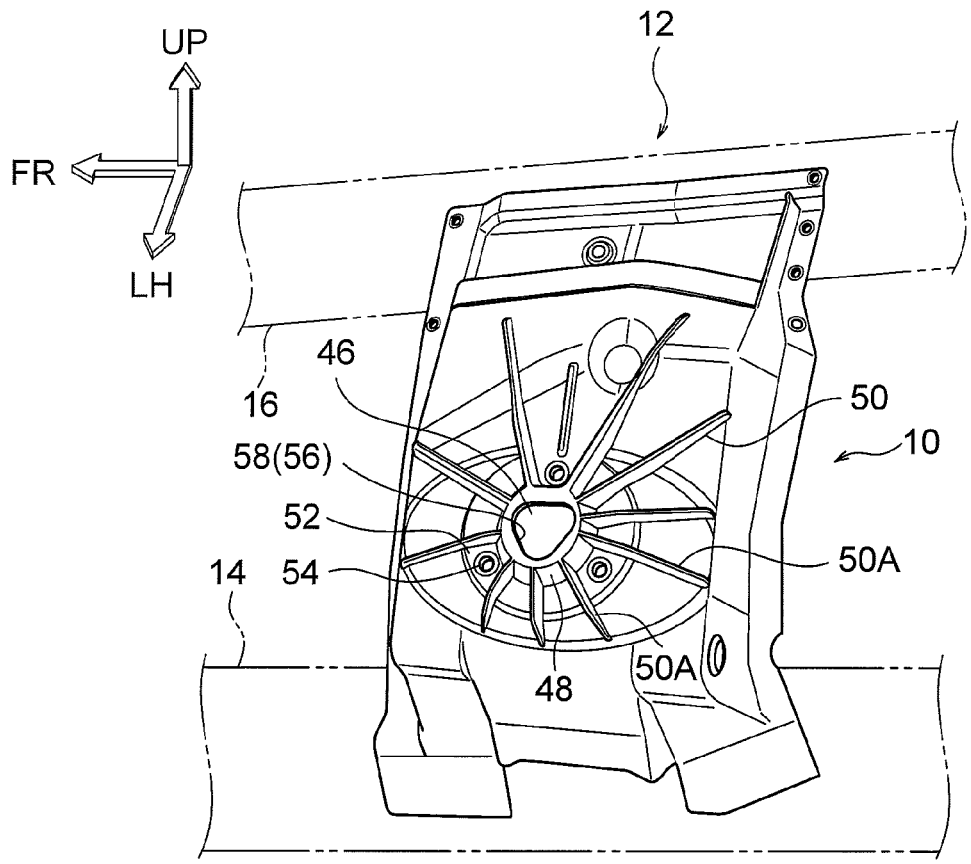
FIG. 1 is a perspective view showing main portions of a vehicle front portion structure relating to an embodiment of the present invention.
Figure 2:
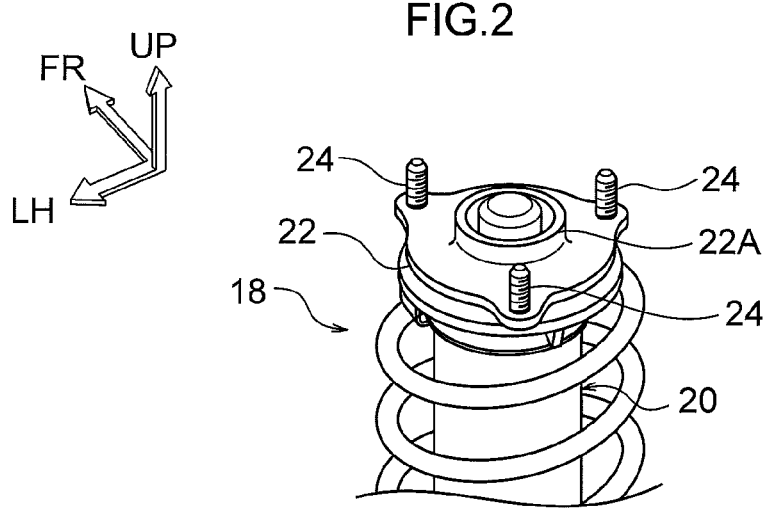
FIG. 2 is a perspective view showing the structure of the upper portion side of a suspension that the vehicle front portion structure has.

The vehicle front portion structure 12 relating to the present embodiment is applied to, for example, a sedan type vehicle, and, as shown in FIG. 1, has a front side member 14, an upper member 16 and the suspension tower 10. Further, the vehicle front portion structure 12 has the suspension 18 that is shown in FIG. 2. Note that these structural elements are provided respectively at the left and right both side portions of the vehicle front portion. However, because these structural elements have basically the same structures, other than being formed symmetrically at the left and the right, the structure at the vehicle right side is described, and description of the structure at the vehicle left side is omitted.

The front side member 14 is a skeleton member of a vehicle body that extends in the vehicle longitudinal direction at each side portion of the vehicle front portion, and is formed in a rectangular closed cross-sectional shape as seen from the vehicle longitudinal direction. An unillustrated bumper reinforcement is connected to the front end portion of the front side member 14.

The upper member 16 is a skeleton member of the vehicle body that extends in the vehicle longitudinal direction at the vehicle upper side and the vehicle transverse direction outer side of the front side member 14. This upper member 16 is formed in a rectangular closed cross-sectional shape as seen from the vehicle longitudinal direction, and spans between an unillustrated front pillar and radiator support.

The suspension 18 is a front suspension for suspending the front wheel of the vehicle at the vehicle body, and is, for example, a double wishbone type suspension. An upper mount portion 22, that is formed substantially in the shape of a disc that is coaxial with a shock absorber 20, is provided at the upper end portion of the shock absorber 20 that the suspension 18 has. A positioning portion 22A, that is cylindrical and that projects-out toward the vehicle upper side, is formed at the central portion of the upper mount portion 22. Plural bolts 24 are fixed to the outer peripheral portion of the upper mount portion 22. These bolts 24 are lined-up at uniform intervals or substantially uniform intervals in the peripheral direction of the positioning portion 22A, and the suspension 18 is mounted to the suspension tower 10 by using these bolts 24.

Figure 3:
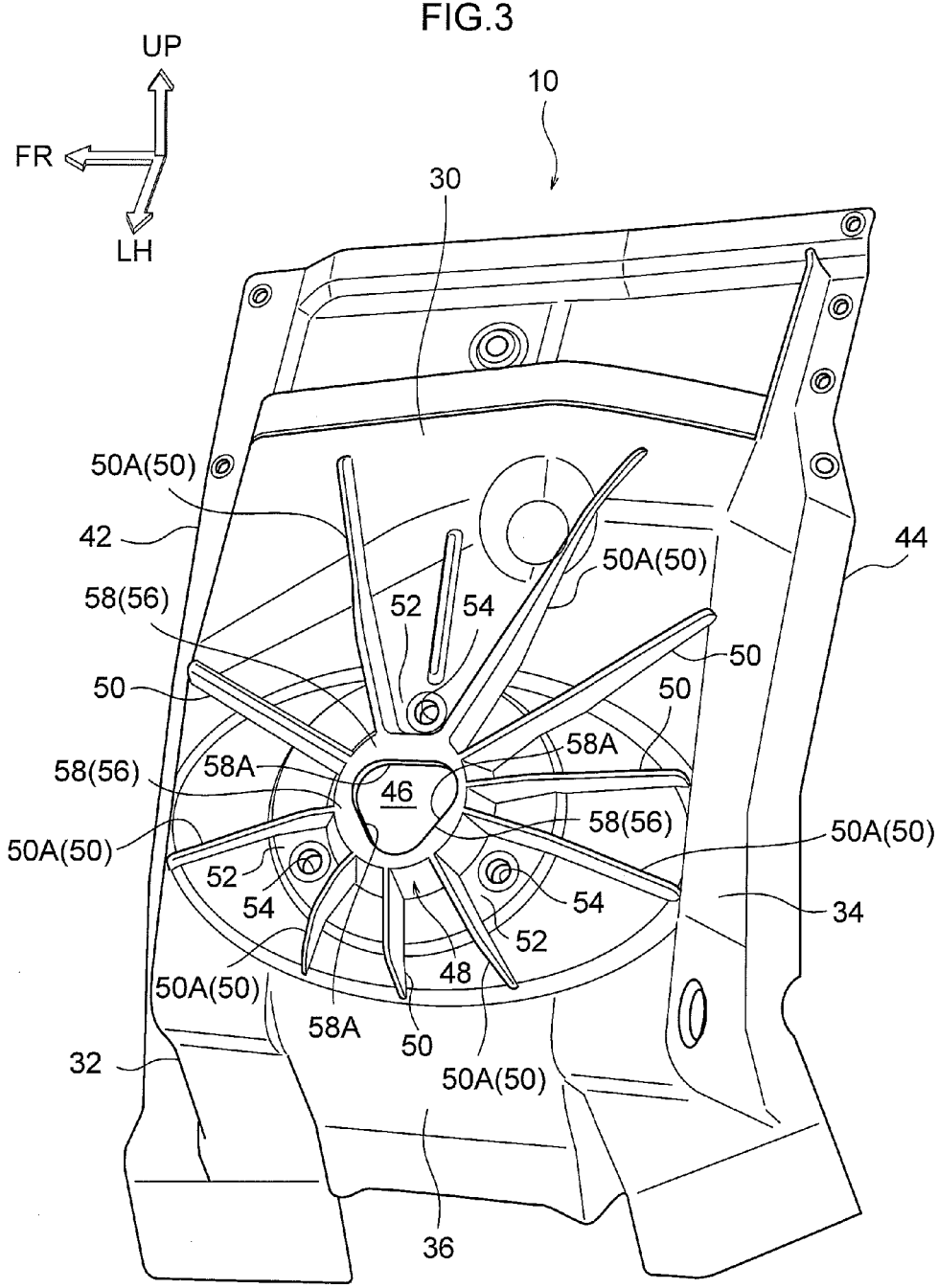
FIG. 3 is a perspective view showing, in an enlarged manner, a suspension tower shown in FIG. 1.
Figure 4:
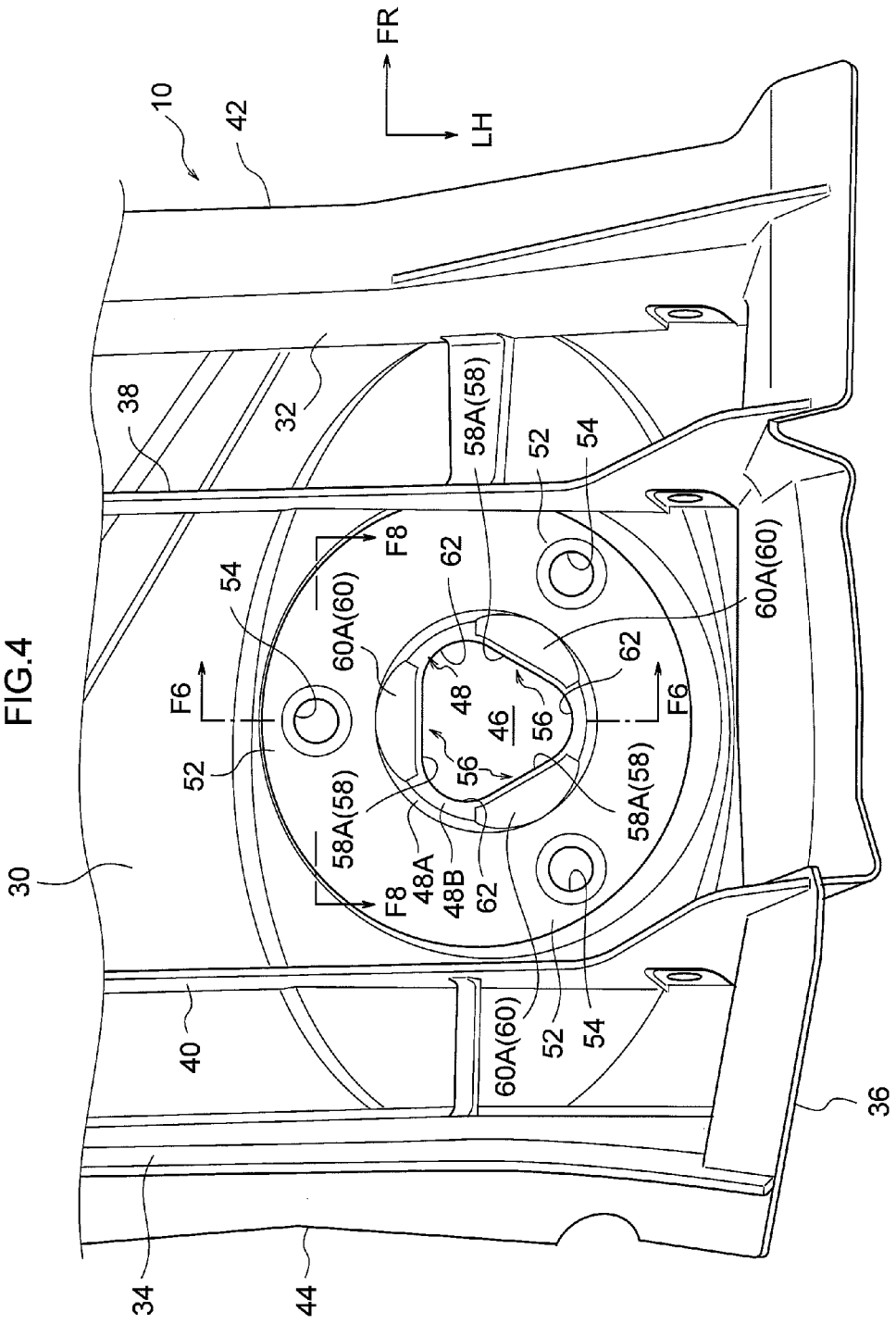
FIG. 4 is a bottom view showing, in an enlarged manner, a state in which main portions of the suspension tower are seen from a vehicle lower side.

In the present embodiment, the suspension tower 10 is a casting that is made of a light metal such as aluminum or the like. The vehicle transverse direction inner side portion of the lower end portion of this suspension tower 10 is fixed to the front side member 14, and the vehicle transverse direction outer side portion of the upper end portion is fixed to the upper member 16, such that the suspension tower 10 spans between the front side member 14 and the upper member 16. As shown in FIG. 3 and FIG. 4, the suspension tower 10 has a top wall 30, a front wall 32, a rear wall 34, and a vehicle transverse direction inner side wall 36 that are integral. This is a structure in which the upper portion of the suspension 18 is covered from the vehicle inner side by the suspension tower 10.

The thickness direction of the top wall 30 runs substantially along the vehicle vertical direction, and the top wall 30 is formed in a rectangular shape as seen in plan view. The front wall 32 extends from the front end portion of the top wall 30 toward the vehicle lower side. The rear wall 34 extends from the rear end portion of the top wall 30 toward the vehicle lower side. Further, the vehicle transverse direction inner side wall 36 extends from the vehicle transverse direction inner side end portion of the top wall 30 toward the vehicle lower side. The front wall 32 and the rear wall 34 are connected in the vehicle longitudinal direction by the vehicle transverse direction inner side wall 36.

Further, at the suspension tower 10, as shown in FIG. 4, a pair of front and rear rib-shaped walls 38, 40 that are formed in the shapes of ribs are provided between the front wall 32 and the rear wall 34. These rib-shaped walls 38, 40 extend integrally toward the vehicle outer side from the bottom surface of the top wall 30 and the vehicle transverse direction outer side surface of the vehicle transverse direction inner side wall 36. In the same way as the front wall 32 and the rear wall 34, the thickness directions of the rib-shaped walls 38, 40 run along the vehicle longitudinal direction. The front wall 32 and the rear wall 34, and the pair of front and rear rib-shaped walls 38, 40, are lined-up in the vehicle longitudinal direction with intervals therebetween.

Moreover, a flange portion 42 extends toward the vehicle front side from the vehicle transverse direction outer side end portion of the front wall 32. A flange portion 44 extends toward the vehicle rear side from the vehicle transverse direction outer side end portion of the rear wall 34. Front and rear panel portions (not shown), that structure a front fender apron, are joined to these flange portions 42, 44.

A shaft hole 46 is formed in the top wall 30 of the above-described suspension tower 10, at a region that faces the central portion of the upper end portion of the suspension 18. This shaft hole 46 is formed so as to be further toward the vehicle transverse direction inner side than the central portion of the top wall 30. The aforementioned positioning portion 22A of the upper mount portion 22 is inserted in this shaft hole 46. Due thereto, this is a structure in which the upper end portion of the suspension 18 is positioned at the suspension tower 10.

A projecting portion (annular projecting portion) 48, that projects-out in an annular shape toward the vehicle upper side, is formed integrally at the edge portion of the shaft hole 46 at the top wall 30. This projecting portion 48 is structured by a vertical wall portion 48A, that projects-out in a cylindrical shape from the edge portion of the shaft hole 46 along the thickness direction of the top wall 30 toward the vehicle upper side, and a flange portion 48B, that projects-out in the shape of a ring from the top end of the vertical wall portion 48A toward the central side of the shaft hole 46.

Further, plural ribs 50 that project-out toward the vehicle upper side are formed at the top wall 30 of the suspension tower 10. These ribs 50 extend in a radial form from the outer periphery of the vertical wall portion 48A toward the outer peripheral side of the top wall 30. The projecting height of these ribs 50 from the top wall 30 gradually decreases toward the outer peripheral side of the top wall 30.

Moreover, plural (here, three) suspension mounting portions 52, that are for mounting the upper end portion of the suspension 18, are provided at the periphery of the projecting portion 48 at the top wall 30 of the suspension tower 10. These suspension mounting portions 52 are lined-up at uniform intervals or substantially uniform intervals in the peripheral direction of the projecting portion 48, and are respectively disposed between pairs of the ribs 50 that are adjacent to one another in the peripheral direction of the projecting portion 48. Namely, in the present embodiment, the plural ribs 50 include three sets of pairs of ribs 50 (hereinafter called "ribs 50A") that are adjacent to one another and between which the three suspension mounting portions 52 are provided respectively. The other ribs 50 are disposed so as to be apart, in the peripheral direction of the projecting portion 48, from the suspension mounting portions 52.

A suspension mounting hole 54 that is round is formed in each of the suspension mounting portions 52. The plural bolts 24, that are provided at the upper end portion of the suspension 18, are inserted into these suspension mounting holes 54. Nuts 23 (see FIG. 8) are screwed-together with the bolts 24. The upper end portion of the suspension 18 is thereby fastened and fixed to the plural suspension mounting portions 52.

Moreover, the suspension tower 10 has, between the plural suspension mounting portions 52 and the shaft hole 46, plural (here, three) overhang portions 56 that jut-out locally from the projecting portion 48 toward the shaft hole 46 side. These overhang portions 56 are provided integrally with rib connecting portions 49 that are circular arc shaped and that are regions that connect the pairs of ribs 50A at the projecting portion 48. These overhang portions 56 can be interpreted as being reinforcing portions that locally (partially) reinforce the projecting portion 48 at the rib connecting portions 49, or as rigidity improving portions that locally improve the rigidity of the projecting portion 48 at the rib connecting portions 49. At the rib connecting portions 49 at which the overhang portions 56 are provided, the rigidity is improved as compared with the regions adjacent to the rib connecting portions 49 at the projecting portion 48. The respective overhang portions 56 are described in detail hereinafter.

Figure 5:
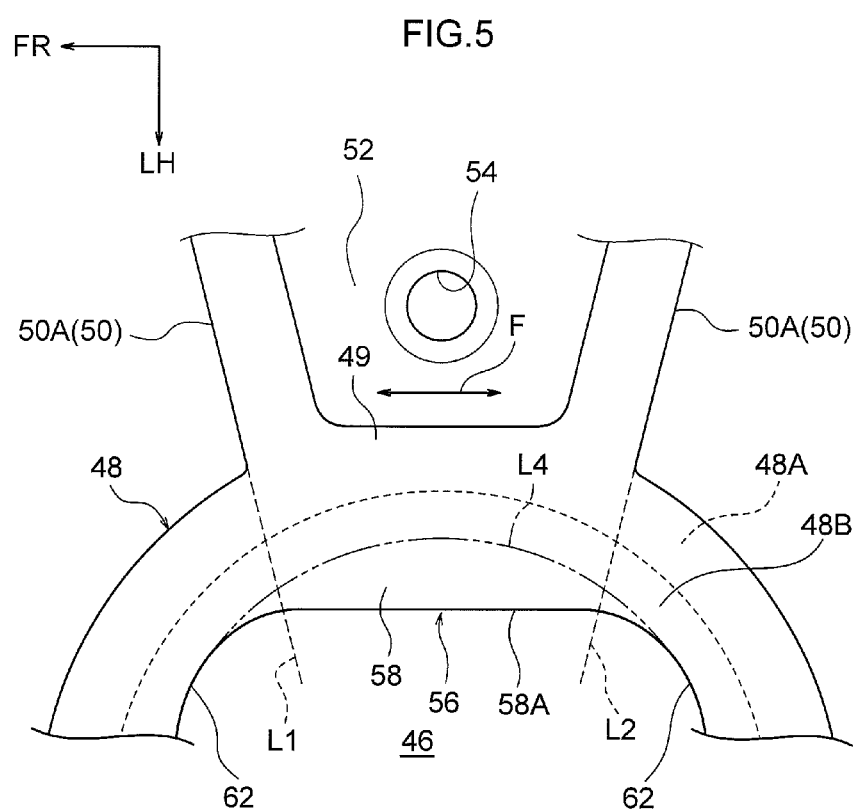
FIG. 5 is an expanded view showing, in an enlarged manner, a state in which a portion of FIG. 3 is seen from a vehicle upper side.
Figure 6:
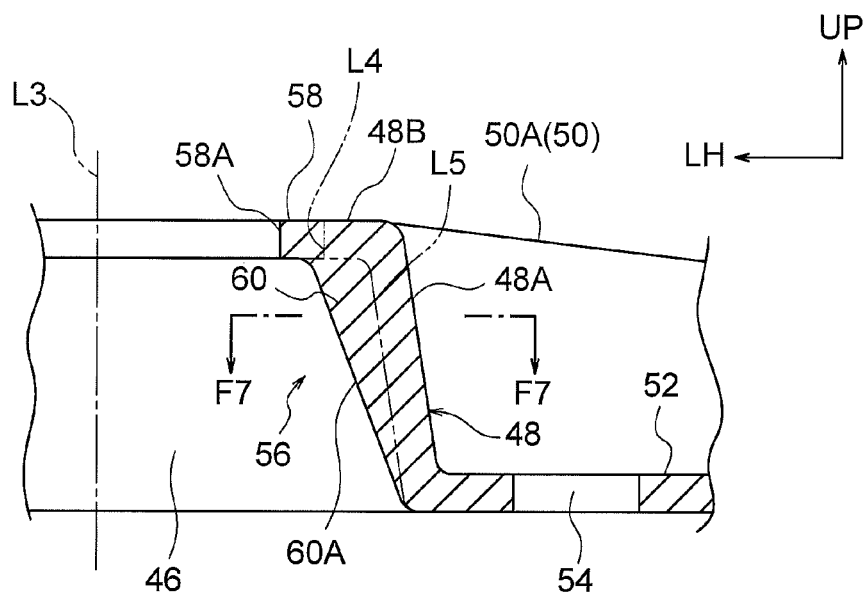
FIG. 6 is a cross-sectional view showing, in an enlarged manner, a cross-section taken along line F6-F6 of FIG. 4.

As shown in FIG. 3 through FIG. 7, each of the overhang portions 56 is structured by an extending portion 58, that extends from the upper end of the projecting portion 48 toward the shaft hole 46 side, and an increased thickness portion 60 whose thickness is increased at the shaft hole 46 side of the projecting portion 48. The respective extending portions 58 extend from the inner peripheral side end portion of the flange portion 48B toward the central side of the shaft hole 46, and are formed in the shapes of plates that are integral with the flange portion 48B. Note that two-dot chain line L4 shown in FIG. 5 and FIG. 6 shows the boundary between the projecting portion 48 and the extending portions 58.

Circular arc portions 62, that are circular arc shaped and are structured by the inner periphery of the flange portion 48B, are formed respectively between the plural extending portions 58 at the projecting portion 48. Therefore, the upper end opening of the shaft hole 46, that is structured by the flange portion 48B and the three extending portions 58, is formed in a shape in which the three corner portions of a triangle are chamfered in circular arc shapes respectively. The lower end opening of the shaft hole 46, that is structured by the lower end portion of the vertical wall portion 48A, is formed in a circular shape.

When viewed from the axial direction of the shaft hole 46 as shown in FIG. 5, each of the extending portions 58 is provided at the entire region between a pair of virtual lines L1, L2 that are extensions, toward the central side of the shaft hole 46, of the surfaces, that are at the sides opposite the suspension mounting portion 52, of the pair of ribs 50A that are positioned adjacent to that extending portion 58. Further, the both end portions, in the peripheral direction of the shaft hole 46, of each of the extending portions 58 extend toward the outer sides of the pair of virtual lines L1, L2, and are smoothly continuous with the above-described circular arc portions 62.

Figure 7:
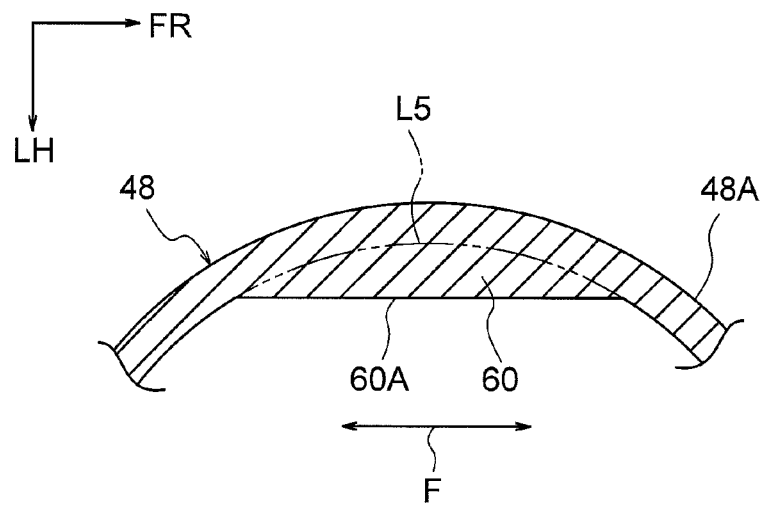
FIG. 7 is a cross-sectional view corresponding to a cross-section taken along line F7-F7 of FIG. 6.

On the other hand, the respective increased thickness portions 60 are formed integrally with the shaft hole 46 sides of the vertical wall portion 48A and the flange portion 48B, and are provided so as to increase the thicknesses of the vertical wall portion 48A and the flange portion 48B at the shaft hole 46 side. The respective increased thickness portions 60 are disposed at the vehicle lower sides of the respective extending portions 58, and, as shown in FIG. 6, the thicknesses thereof gradually decrease toward the vehicle lower side. The both end portions, in the peripheral direction of the shaft hole 46, of the respective increased thickness portions 60 are smoothly continuous with the inner peripheral surface of the vertical wall portion 48A. Note that two-dot chain line L5 that is shown in FIG. 6 and FIG. 7 indicates the boundary between the projecting portion 48 and the increased thickness portions 60.

The end portion (end surface) at the shaft hole 46 side of each of the extending portions 58 includes a upper flat portion 58A that extends in a flat shape in the direction (refer to arrow F in FIG. 5, FIG. 7 and FIG. 8) in which the pair of ribs 50A, that are positioned adjacent to the extending portion 58, are adjacent to one another. Further, the end portion (end surface) at the shaft hole 46 side of each of the increased thickness portions 60 includes a lower flat portion 60A that extends in a flat shape in the aforementioned direction in which the pair of ribs 50A are adjacent to one another. Namely, in the present embodiment, a flat portion (flat surface) that is structured by the upper flat portion 58A and the lower flat portion 60A, is provided at the shaft hole 46 side end portion of the overhang portion 56.

Each of the upper flat portions 58A extends in a rectilinear shape as seen from the axial direction of the shaft hole 46, and extends to as to be orthogonal to the direction connecting the center of the suspension mounting hole 54 and the center of the shaft hole 46. Each of the upper flat portions 58A is provided over substantially the entire region between the aforementioned pair of virtual lines L1, L2. Further, each extending portion 58 is structured so as to not have a portion that juts-out further toward the central side of the shaft hole 46 than the upper flat portion 58A. Note that, in the present embodiment, each of the upper flat portions 58A is provided over substantially the entire region between the pair of virtual lines L1, L2, but the present invention is not limited to the same, and the range over which the upper flat portion 58A is provided can be changed appropriately. Namely, there may be a structure in which the upper flat portion 58A is set only at a portion between the virtual lines L1, L2.

On the other hand, each of the lower flat portions 60A is formed in a planar shape that faces the central side of the shaft hole 46 and slightly downward. As shown in FIG. 6, the lower flat portion 60A is slightly inclined with respect to axis L3 of the shaft hole 46, so as to head toward the radial direction outer side of the shaft hole 46 while heading toward the vehicle lower side. Therefore, the dimension, along the peripheral direction of the shaft hole 46, of each of the lower flat portions 60A gradually decreases toward the vehicle lower side (refer to FIG. 4). Each of the increased thickness portions 60 is a structure that does not have a portion that juts-out further toward the central side of the shaft hole 46 than the lower flat portion 60A. The cross-sectional shape of the shaft hole 46 at the height at which the respective increased thickness portions 60 are provided is formed in a shape in which the three corner portions of a triangle are chamfered in circular arc shapes respectively. Note that, in the present embodiment, the maximum dimension, along the peripheral direction of the shaft hole 46, of each of the lower flat portions 60A is set to be smaller than the dimension, along the peripheral direction of the shaft hole 46, of each of the upper flat portions 58A.

(Operation and Effects)

Operation and effects of the present embodiment are described next

Figure 8:
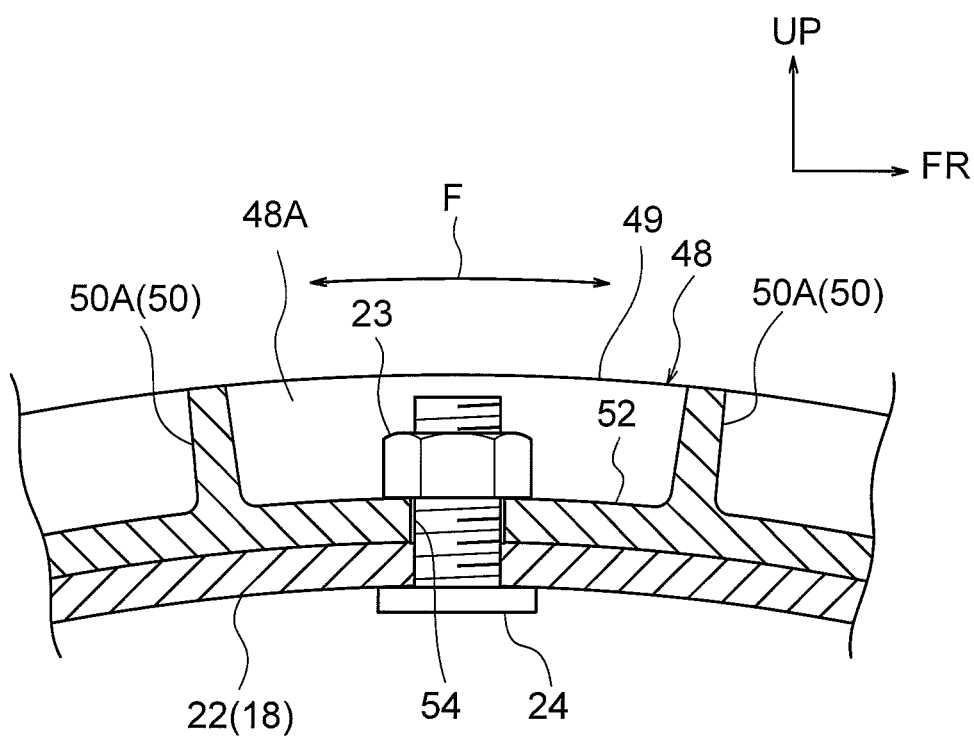
FIG. 8 is a cross-sectional view showing, in an enlarged manner, a cross-section taken along line F8-F8 of FIG. 4, and is a drawing showing, in an exaggerated manner, a state in which a pair of ribs have deformed so as to move apart from one another due to input from the suspension.

In the present embodiment, when upwardly-directed input from the suspension 18 is applied to the suspension mounting portions 52 of the suspension tower 10, the suspension mounting portions 52 and peripheral regions thereof deform so as to become convex toward the vehicle upper side with the suspension mounting holes 54 being the peaks. At this time, as shown in FIG. 8, the pair of ribs 50A that are adjacent to one another with the suspension mounting portion 52 therebetween deform so as to move apart from one another. As a result, the rib connecting portions 49 of the projecting portion 48 are pulled so as to be stretched in the aforementioned direction of moving apart (refer to arrow F of FIG. 5, FIG. 7 and FIG. 8). However, the suspension tower 10 has, at the rib connecting portions 49, the overhang portions that jut-out locally from the projecting portion 48 toward the shaft hole 46 side. Because deformation of the rib connecting portions 49 can be suppressed by the overhang portions 56, this contributes to an improvement in rigidity with respect to input from the suspension 18. As a result, for example, the traveling stability of the vehicle can be improved.

Namely, when the pair of ribs 50A deform so as to move apart from one another as described above, not only tensile stress in the aforementioned direction of moving apart, but also bending stress that attempts to make the circular arc into a rectilinear shape, is generated at the rib connecting portion 49 that is circular arc shaped. Therefore, stress concentrates, for example, at the portion corresponding to the peak of the rib connecting portion, i.e., the central portion in the direction of curving of the rib connecting portion 49. With regard to this point, in the present embodiment, because the overhang portions 56 are provided at the regions where these stresses concentrate, deformation of these regions (the rib connecting portions 49) can be suppressed. Moreover, because the overhang portions 56 are provided locally at the regions where stresses concentrate, an increase in the mass of the suspension tower 10 can be suppressed, and the rigidity of the suspension tower 10 can be improved efficiently.

Moreover, in the present embodiment, the shaft hole 46 side end portions of the overhang portions 56 include the upper flat portions 58A and the lower flat portions 60A. The upper flat portion 58A and the lower flat portion 60A extend in flat shapes in the direction in which the pair of ribs 50A are adjacent to one another, i.e., in the direction in which the rib connecting portion 49 is pulled as described above. Due thereto, stress can be dispersed over the entire upper flat portion 48A and lower flat portion 60A, and load can be received at the entire cross-section of the overhang portion 56. Therefore, this contributes to making it such that a local concentration of stress does not arise. As a result, the rigidity of the suspension tower 10 can be improved more efficiently.

Further, in the present embodiment, the overhang portion 56 has the extending portion 58 that extends integrally from the upper end of the projecting portion 48 toward the shaft hole 46 side. This region where the extending portion 58 extends is the region that is pulled most strongly at the time when the pair of ribs 50A deform so as to move apart from one another. Therefore, by providing the extending portion 58 at this region, deformation of this region can be suppressed effectively.

Moreover, in the present embodiment, the overhang portion 56 has the increased thickness portion 60 where the thickness of the shaft hole 46 side of the projecting portion is increased. This increased thickness portion 60 can be formed easily when the suspension tower 10 is manufactured by casting as in the present embodiment. This point is the same as well for the extending portions 58.

Further, the extending portion 58 and the increased thickness portion 60 are formed at the shaft hole 46 side of the rib connecting portion 49, i.e., at the side where the rib connecting portion 49 starts to bend due to the aforementioned bending stress. Due thereto, the rigidity with respect to this bending stress can be ensured efficiently.

Further, in the present embodiment, when viewed from the axial direction of the shaft hole 46, the extending portion 58 is provided over the entire region between the pair of virtual lines L1, L2 that are extensions, toward the central side of the shaft hole 46, of the surfaces, that are at the sides opposite the suspension mounting portion 52, of the pair of ribs 50A. Due thereto, at the upper end of the projecting portion 48, the rigidity of the entire region that is pulled by the pair of ribs 50A as described above can be improved by the extending portion 58.

<Supplementary Description of Embodiment>

Although the above-described embodiment is structured such that the projecting portion 48 has the flange portion 48B, the present invention is not limited to this and may be a structure in which the flange portion 48B is omitted. In this case, the extending portions 58 may extend directly from the upper end portion of the vertical wall portion 48A.

Further, the above-described embodiment is structured such that the overhang portion 56 has the extending portion 58 and the increased thickness portion 60. However, the present invention is not limited to this, and may be structured such that one of the overhang portion 56 and the extending portion 58 is omitted.

Further, the above-described embodiment is structured such that, when viewed from the axial direction of the shaft hole 46, the extending portion 58 is provided over the entire region between the pair of virtual lines L1, L2. However, the present invention is not limited to this, and the size of the extending portion 58 can be changed appropriately. For example, there may be a structure in which, when viewed from the axial direction of the shaft hole 46, the extending portion is provided only between a pair of virtual lines that are that are extensions, toward the central side of the shaft hole 46, of the surfaces, that are at the suspension mounting portion 52 sides, of the pair of ribs 50A.

Further, the above-described embodiment is structured such that the shaft hole 46 side end portions of the extending portion 58 and the increased thickness portion 60 include the upper flat portion 58A and the lower flat portion 60A. However, the present invention is not limited to this, and may be structured such that one or both of the upper flat portion 58A and the lower flat portion 60A are omitted.

Moreover, although the above-described embodiment is structured such that the suspension tower 10 is a casting, the present invention is not limited to this, and the suspension tower may be formed as a press-molded product. In this case, for example, there is a structure in which the plural ribs are joined to the top wall of the suspension tower by a means such as welding or the like.

In addition, the present invention can be implemented by being modified in various ways within a scope that does not depart from the gist thereof. Further, the scope of the right of the present invention is, of course, not limited to the above-described embodiment.

What is claimed is:

1. A suspension tower comprising:
    a top wall in which a shaft hole is formed at a region that faces a central portion of an upper end portion of a suspension of a vehicle;
    a projecting portion that is formed by an edge portion of the shaft hole at the top wall projecting toward a vehicle upper side;
    a plurality of ribs that extend from an outer periphery of the projecting portion toward an outer peripheral side of the top wall;
    a suspension mounting portion that is provided at the top wall between a pair of the ribs that are adjacent to one another, and to which the upper end portion of the suspension is mounted; and
    an overhang portion that juts-out locally from the projecting portion toward the shaft hole side, between the suspension mounting portion and the shaft hole.

2. The suspension tower of claim 1, wherein an end portion, at the shaft hole side, of the overhang portion includes a flat portion that extends in a flat shape in a direction in which the pair of ribs are adjacent to one another.

3. The suspension tower of claim 1, wherein the overhang portion includes an extending portion that extends from an upper end of the projecting portion toward the shaft hole side.

4. The suspension tower of claim 1, wherein the overhang portion has an increased thickness portion whose thickness is increased at the shaft hole side of the projecting portion.

5. The suspension tower of claim 1, wherein the overhang portion is provided over an entire region between a pair of virtual lines that respectively are extensions, toward a central side of the shaft hole, of surfaces, that are at sides opposite the suspension mounting portion, of the pair of ribs that are adjacent to one another.

6. A vehicle front portion structure comprising:
    a front side member that extends in a vehicle longitudinal direction;
    an upper member that extends in the vehicle longitudinal direction, at a vehicle upper side and a vehicle transverse direction outer side of the front side member;
    the suspension tower of claim 1 that spans between the front side member and the upper member; and
    a suspension whose upper end portion is fixed to the suspension mounting portion provided at the suspension tower.

* * * * *